May 19, 1925. 1,538,446
H. C. NIEMEYER
VEGETABLE HARVESTER
Original Filed March 17, 1921  2 Sheets-Sheet 2
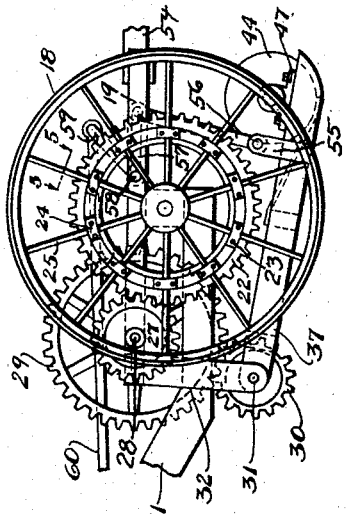
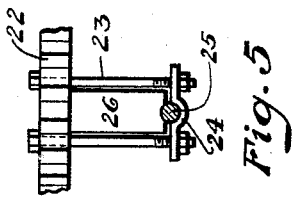
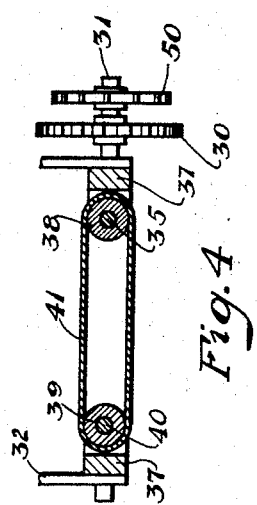
Witnesses:
Inventor
Henry C. Niemeyer
His Attorney Patented May 19, 1925.

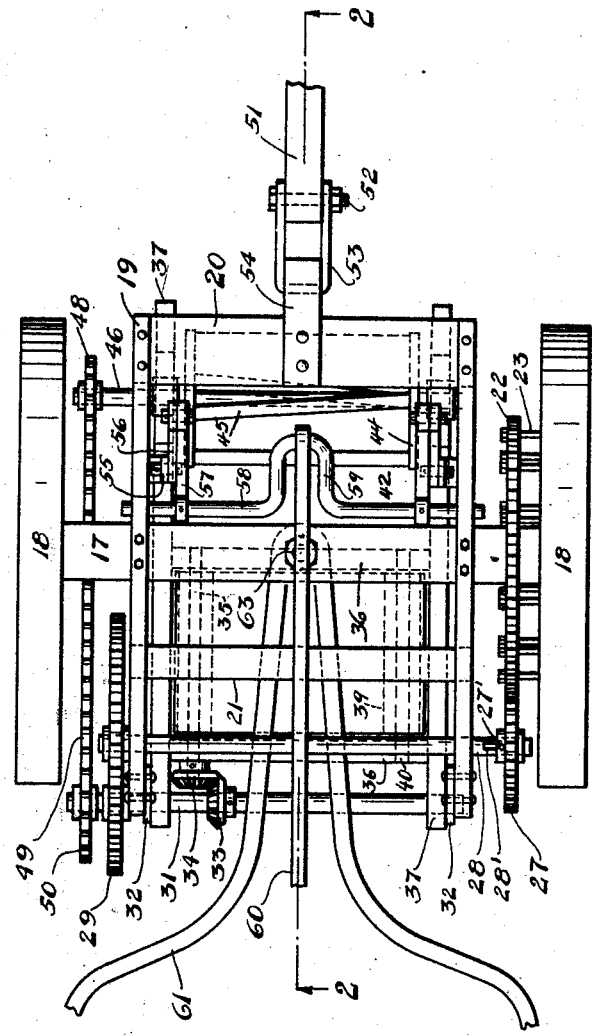

1,538,446

UNITED STATES PATENT OFFICE.

HENRY C. NIEMEYER, OF CHICAGO, ILLINOIS.

VEGETABLE HARVESTER.

Original application filed March 17, 1921, Serial No. 453,046. Divided and this application filed November 21, 1921. Serial No. 516,686.

*To all whom it may concern:*

Be it known that I, HENRY C. NIEMEYER, a citizen of the United States, and a resident of the city of Chicago, county of Cook and State of Illinois, have invented certain new and useful Improvements in Vegetable Harvesters, of which the following is a specification.

My invention relates to new and useful improvements in vegetable harvesters and more particularly to a top-clipping mechanism, and has for its object to provide efficient means for clipping the tops of foliage from onions and other vegetables. This application is a division of my co-pending application for vegetable harvesters, Serial No. 453,046, filed March 17, 1921.

Other objects will appear hereinafter.

The invention consists in the combinations and arrangements of parts hereinafter described and claimed.

The invention will be best understood by reference to the accompanying drawings forming a part of this specification, and in which, Fig. 1 is a plan view of the top-clipping mechanism;

Fig. 2 is a vertical sectional view of the mechanism, taken on line 2—2 of Fig. 1;

Fig. 3 is a side elevation of the mechanism;

Fig. 4 is a sectional view of the foliage conveyor taken on line 4—4 of Fig. 2, and Fig. 5 is a fragmentary view, taken on line 5—5 of Fig. 3, showing the connection between the main gear and a spoke of the front wheel.

The top-clipping mechanism disclosed in this application comprises an axle 17 carried by wheels 18, which constitute the front axle and wheels of the complete harvester, disclosed in the parent case above identified. A frame is mounted on this axle, which includes side members 19 bolted upon the axle, and cross-bars 20 and 21 connecting said side members. A large gear wheel 22 is rigidly mounted on one of the front wheels 18 by means of bolts 23 passing through openings provided in said gear and through openings in yokes 24 which engage the spokes 25 of said wheel, (see Figs. 1 and 5), plates 26 being provided between the bolts 23, which engage the sides of the spokes 25. Said gear wheel 22 meshes with a pinion 27 fastened to one end of a shaft 28, by means of a set-screw 27' which engages in a groove 28' in shaft 28 and permits the gear to be shifted inward on said shaft out of mesh with gear 22 of the wheel. Said shaft 28 is mounted in the frame members 19 and carries a gear 29 fixed on its other end, said gear meshing with a pinion 30 fastened on a shaft 31 rotatably mounted in the lower end of bracket members 32, which are riveted to and depend from the rear of said frame. A bevel pinion 33 is fastened on said shaft 31 and meshes with a similar pinion 34 fastened on the rear of a longitudinal rod 35 which is rotatably mounted adjacent one end of cross-beams 36 carried by the side bars 37 of the clipper frame, which bars have their rear ends pivoted on the shaft 31. A roller 38 is fixed on the rod 35 (see Figs. 2 and 4) and a similar roller 39 is rotatably mounted with a rod 40 in the opposite ends of the cross-beams 36. A continuous apron 41, of any suitable flexible material, is fastened over said rollers and is actuated by the roller 38 to carry away the tops or foliage of the onions or vegetables to one side of the clipper frame. A metal sheet 42, in the shape of a short platform, is fastened between the frame bars 37, extending forward from the top of the front cross-bar 36 to the lower front ends of said frame bars 37, and is provided with a cutting edge 43 at its forward end. A rotatable cutting member 44 is mounted in the frame immediately above the cutting edge 43 and is provided with a plurality of cutting blades 45, which co-operate with said edge to clip tops or foliage. These cutting blades are mounted between two circular side members, which are fastened on a shaft 46 rotatably mounted in brackets 47 bolted on the forward ends of the bars 37, as best seen in Fig. 3. A sprocket wheel 48 is fastened to one end of said shaft and carries a chain 49 which engages over a sprocket wheel 50 fastened on the outer end of shaft 31, adjacent the gear 30, as best seen in Fig. 4. Arms 55 extend upward from the frame bars 37, as best shown in Fig. 2, and are pivotally connected to links 56 which are pivoted at their upper ends to crank arms 57 rigidly fastened on a crank rod 58, (see Fig. 1) which has its ends journaled in the side bars 19 and is provided with a yoke 59 at its middle portion. A control rod 60 is connected to the bight of this yoke and connects with a suitable control mechanism, as fully disclosed in the above identified parent case. By moving said control rod forward or rearward the cutting mechanism and the conveying apron are moved downward or upward, respectively.

A beam or tongue 51 is provided by means of which the machine may be drawn and guided. This tongue is mounted on the front cross-bar 20 in any convenient manner, as by a bolt 52, yoke 53 and stud-beam 54, which allows vertical movement to said tongue.

This topping or clipping mechanism, as disclosed, is connected to the main frame and digging portion of the vegetable harvester (disclosed in the above identified parent case) by a frame member 61 which is pivotally connected with its forward portion or bight 62 upon a king pin 63, which extends through the center of the front axle 17, lock nuts 64 or other suitable means being provided to retain the king pin in position.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A top clipping machine of the class described, comprising a clipper frame mounted between the wheels of said machine to tilt on a rearward pivot; a pair of cross beams on said frame; a sheet metal platform extending forward from the front cross beam; a cutting edge on the front of said platform; a member rotating on a horizontal axis and provided with cutting blades co-operating with said edge; a pair of longitudinally extending rollers mounted between said cross beams; a continuous apron mounted on said rollers to convey tops to the side of the machine; driving means on a wheel; and transmission mechanism connecting said driving means with said rollers and said rotating member.

2. A foliage clipping machine of the class described comprising a frame mounted between the wheels; a shaft rotatably mounted on said frame; a clipper frame swingably mounted on said shaft; a pair of cross beams on said swingable frame; a metal platform extending forward from the front cross beam; a cutting edge on the front of said platform; a rotatable cutter mounted on said swingable frame to co-operate with said cutting edge; a pair of rollers mounted between said cross beams; an apron mounted on said roller to carry clipped foliage to the side of the machine; driving mechanism mounted on one of said wheels; transmission means between said driving mechanism and said shaft; means for rotating said rollers and apron through said shaft; and transmission mechanism including a member fixed on said shaft for operating said rotatable cutter.

3. A foliage clipping machine of the class described, comprising a frame mounted between the wheels; a shaft rotatably mounted on said frame; a clipper frame swingably mounted on said shaft; a pair of cross beams on said swingable frame; a metal platform extending forward from the top of the front cross beam; a cutting edge on said platform; a rotatable cutter mounted on said swingable frame and having cutting blades to cooperate with said cutting edge; a pair of longitudinally extending rollers mounted between said cross beams; an apron mounted on said rollers to carry clipped foliage to the side of the machine; driving mechanism mounted on one of said wheels; gear means between said driving mechanism and said shaft; transmission mechanism for rotating said rollers and apron by means of said shaft; and transmission mechanism including a wheel fixed on said shaft for rotating said rotatable cutter.

In testimony whereof I have signed my name to this specification in the presence of two subscribing witnesses.

HENRY C. NIEMEYER.

Witnesses:
   JOSHUA R. H. POTTS,
   B. G. RICHARDS.